United States Patent [19]
Cole

[11] Patent Number: 5,578,115
[45] Date of Patent: Nov. 26, 1996

[54] MOLECULAR SIEVE CONTAINER FOR OXYGEN CONCENTRATOR

[75] Inventor: Mark A. Cole, Somerset, Pa.

[73] Assignee: DeVilbiss Health Care, Inc., Somerset, Pa.

[21] Appl. No.: 505,876

[22] Filed: Jul. 24, 1995

[51] Int. Cl.⁶ ................................. B01D 53/053
[52] U.S. Cl. .................. 96/121; 96/130; 96/143; 96/151
[58] Field of Search .................. 96/121–133, 143–146, 96/151, 108, 109

[56] References Cited

U.S. PATENT DOCUMENTS

| | | | |
|---|---|---|---|
| 1,593,137 | 7/1926 | O'Rourke et al. | 96/131 |
| 2,101,555 | 12/1937 | Moore et al. | 96/127 X |
| 3,186,148 | 6/1965 | Merrill et al. | 96/131 |
| 3,324,631 | 6/1967 | Kreuter | 96/130 X |
| 4,559,065 | 12/1985 | Null et al. | 96/126 X |
| 4,822,384 | 4/1989 | Kato et al. | 55/158 |
| 4,925,464 | 5/1990 | Rabenau et al. | 55/179 |
| 5,112,367 | 5/1992 | Hill | 55/26 |
| 5,268,021 | 12/1993 | Hill et al. | 95/98 |

FOREIGN PATENT DOCUMENTS

| | | | |
|---|---|---|---|
| 2550466 | 2/1985 | France | 96/133 |
| 0288531 | 4/1991 | Germany | 96/130 |
| 4-122411 | 4/1992 | Japan | 96/130 |
| 0425621 | 3/1935 | United Kingdom | 96/126 |
| 2232364 | 12/1990 | United Kingdom | 96/133 |

Primary Examiner—Robert Spitzer
Attorney, Agent, or Firm—MacMillan, Sobanski & Todd

[57] ABSTRACT

A container for a plurality of molecular sieve beds for use in a pressure swing oxygen concentrator. An extrusion defines at least two and preferably at least three passages extending between open ends of the extrusion. The extrusion ends are closed by first and second end caps secured to the extrusion. Two of the passages form separate molecular sieve containers and a third passage may form an accumulator for storing concentrated oxygen. In a preferred embodiment, the first end cap has separate inlet ports for each molecular sieve container and an outlet port for the accumulator. The second end cap has separate outlet ports for each molecular sieve container and an inlet port for the accumulator. Optionally, the second end cap may include a restricted passage allowing a limited oxygen flow between the outlet ports from the molecular sieve containers and the second end cap may include check valves and passages which allow pressurized oxygen to flow from each molecular sieve container outlet port to the accumulator inlet port. The first end cap may include a feed gas port and an exhaust gas port connected through a flow control valve to the molecular sieve container inlet ports.

17 Claims, 6 Drawing Sheets

5,578,115

MOLECULAR SIEVE CONTAINER FOR OXYGEN CONCENTRATOR

TECHNICAL FIELD

The invention relates to pressure swing molecular sieve oxygen concentrators and more particularly to a container for a plurality of molecular sieve beds for use in a pressure swing oxygen concentrator.

BACKGROUND ART

Oxygen concentrators are used, for example, as a source of high purity oxygen for medical applications. An oxygen concentrator will separate air into two gas streams, one of which consists primarily of oxygen and the other of which consists primarily of nitrogen. A pressure swing molecular sieve oxygen concentrator typically has at least two molecular sieve beds. Each molecular sieve bed typically consists of a closed cylindrical container partially filled with a sieve material, such as zeolite, which will pass a flow of oxygen molecules while blocking the flow of larger nitrogen molecules. In operation, a compressor applies filtered pressurized air through a flow control valve to an inlet port on one of the molecular sieve beds and about 95% pure oxygen flows under pressure from an outlet port on such bed. The oxygen may flow to an accumulator and then pass through a pressure regulator, an optional flow meter and a final filter to a patient. As oxygen flows through the sieve bed, the separated nitrogen is retained in the sieve bed. After a short time, one or more valves are changed to apply the pressurized air to the inlet port of a second sieve bed and to vent the inlet port of the first sieve bed. A small portion of the pressurized oxygen output from the second sieve bed is delivered to the outlet port of the first sieve bed to purge nitrogen and any other trapped gases from the first sieve bed. The valves are periodically reversed to alternate the sieve beds between the gas separating cycle and the trapped gas purging cycle. The optional accumulator holds a volume of concentrated oxygen under pressure to provide a continuous oxygen flow when the valves are cycled.

In prior art oxygen concentrators, the molecular sieve beds are constructed as individual components which typically each includes a cylindrical container. The accumulator is still a third container. A typical oxygen concentrator uses at least two molecular sieve beds which must be connected together and connected to valves either with tubing and fittings or with manifolds. The number of fittings and connections for handling the pressurized air feed gas and the pressurized oxygen outlet gas present a potential for leaks and assembly errors. Further, both the number of parts required and the time required for assembly can adversely affect the reliability and the manufacturing cost of prior art oxygen concentrators.

DISCLOSURE OF INVENTION

The present invention is directed to an improved container for a plurality of molecular sieves for use in a pressure swing oxygen concentrator. At least two molecular sieve beds are formed as a unit with a single extruded container. Preferably, the extrusion has three cavities. The extrusion is cut to a desired length to provide a desired capacity to the sieve beds and end caps are secured to the extrusion with screws and resilient seals. Each of the cavities is closed by the end caps. Two of the closed cavities form molecular sieve containers which are partially filled with a conventional molecular sieve material, such as a suitable zeolite. the third cavity serves as an accumulator for receiving and storing the concentrated oxygen from the molecular sieve containers.

Each end cap may have separate threaded openings connecting into each cavity for connecting suitable fittings and hoses as in a conventional oxygen concentrator. Or, preferably, a lower one of the end caps may include passages with check valves connecting outlet ports from the two sieve containers to tile accumulator and a passage having an orifice or restriction interconnecting the outlet ports of the two sieve containers. An upper one of the end caps may be adapted to mount the flow control valve. The upper end cap can from a manifold and include air passages for the valve to direct the proper air flow to and from the sieve beds. The upper end cap also may include two threaded ports for tile feed and exhaust gas to be hooked to the compressor.

Accordingly, it is an object of the invention to provide an improved low cost construction for containers for molecular sieve beds for use with a pressure swing oxygen concentrator.

Other objects and advantages of the invention will become apparent from the following detailed description of the invention and the accompanying drawings.

BEST MODE FOR CARRYING OUT THE INVENTION

Figure 1:
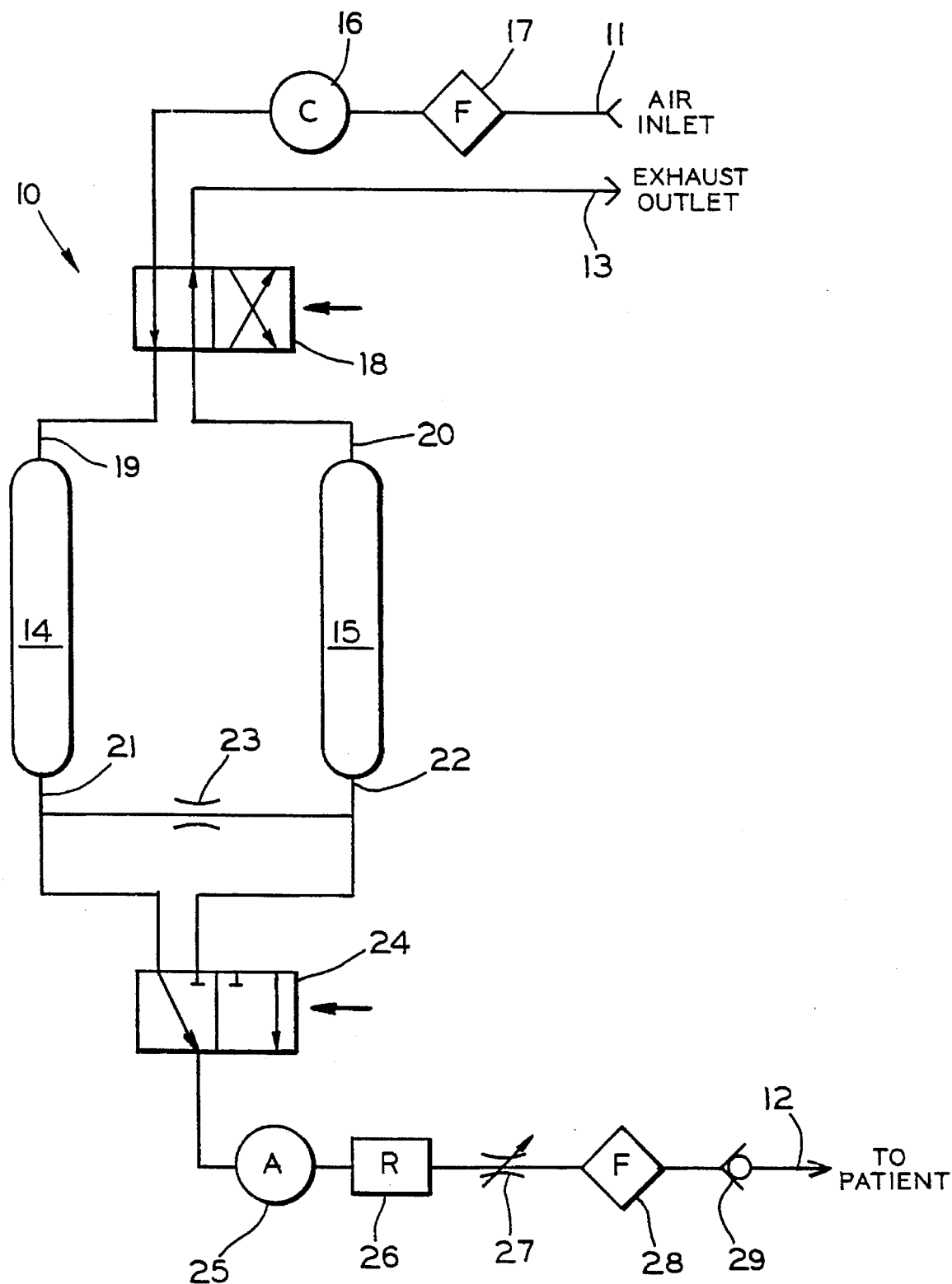
FIG. 1 is a schematic diagram illustrating the pneumatic circuit of an exemplary prior an pressure swing oxygen concentrator.

Referring to FIG. 1 of the drawings, a pneumatic diagram is shown for a typical prior art pressure swing oxygen concentrator 10. The oxygen concentrator 10 has an air inlet 11, a pressurized concentrated oxygen outlet 12 for delivering oxygen to a patient, and an exhaust gas outlet 13. A gas consisting primarily of nitrogen is separated from a gas consisting primarily of oxygen in two molecular sieve beds 14 and 15. Each molecular sieve bed is partially filled with a suitable filter material, such as a zeolite, which will pass oxygen molecules while blocking the flow of larger nitrogen molecules. A compressor 16 draws ambient air through a filter 17 and delivers pressurized air through a valve 18 alternately to the molecular sieve beds 14 and 15. The valve 18 has two positions. In the illustrated position, the valve 18 connects the compressor 16 to apply pressurized air to an inlet port 19 to the molecular sieve 14 and connects an inlet port 20 to the molecular sieve 15 to the exhaust gas outlet 13. In the second position, the valve 18 connects the compressor 16 to apply pressurized air to the inlet port 20 to the molecular sieve 15 and connects the inlet port 19 of the molecular sieve bed 14 to the exhaust gas outlet 13.

The molecular sieve beds 14 and 15 have outlet ports 21 and 22, respectively. The outlet ports 21 and 22 are connected together through a calibrated orifice 23 to permit a limited flow of concentrated oxygen from the higher pressure one of the molecular sieve beds 14 and 15 to the lower pressure molecular sieve bed 15 or 14. A two position valve 24 may be provided to selectively connect one of the molecular sieve outlet ports 21 or 22 to a concentrated oxygen accumulator 25. From the accumulator 25 concentrated oxygen flows through a pressure regulator 26, a flow meter 27, a filter 28 and a check valve 29 to the outlet 12.

In operation, the valves 18 and 24 are operated together and may initially be positioned as illustrated with the pressurized air from the compressor 16 applied to the inlet port 19 of the molecular sieve bed 14 and the outlet port 21 of the molecular sieve bed 14 connected to the accumulator. The inlet port 20 to the molecular sieve bed 15 is connected to the exhaust gas outlet 13. As pressurized air is delivered to the molecular sieve bed 14, concentrated oxygen flows from the outlet port 21 to the accumulator 25. A small portion of the concentrated oxygen at the port 21 also flows through the orifice 23 and in a reverse direction through the molecular sieve bed 15 to the exhaust gas outlet 13 to purge nitrogen from the molecular sieve bed 15. As concentrated oxygen is discharged from the molecular sieve 14, nitrogen is retained in the molecular sieve bed 14. After a short period of time, both valves 18 and 24 are simultaneously shifted (to the left in FIG. 1). This reverses the cycle and the molecular sieve bed 15 begins separating a flow of concentrated oxygen and retaining the nitrogen, while nitrogen is purged from the molecular sieve bed 14.

Figure 2:
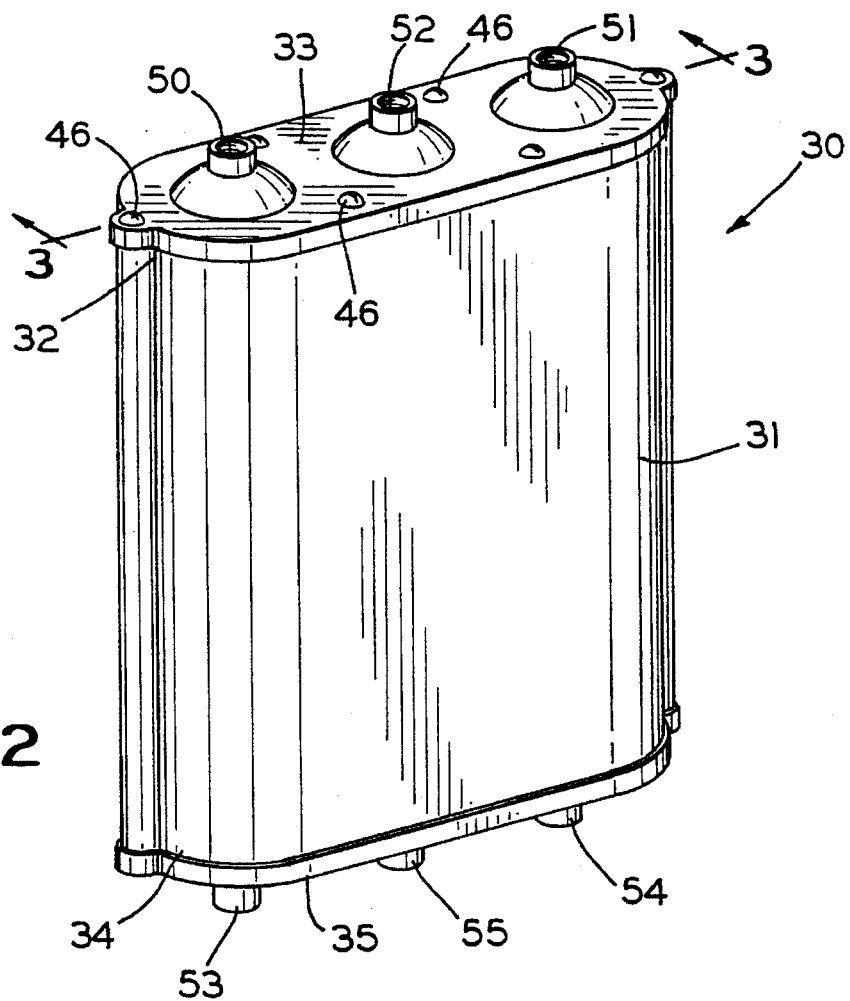
FIG. 2 is a perspective view of a molecular sieve container according to a preferred embodiment of the invention.
Figure 3:
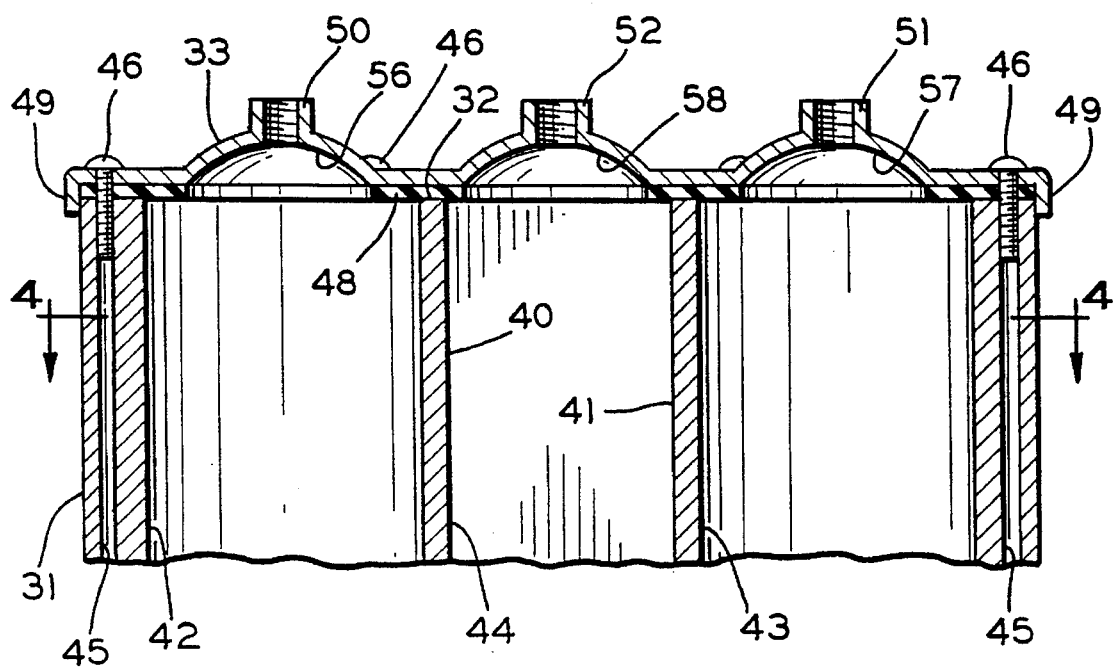
FIG. 3 is a fragmentary cross sectional view through the molecular sieve container as taken along line 3—3 of FIG. 2.
Figure 4:
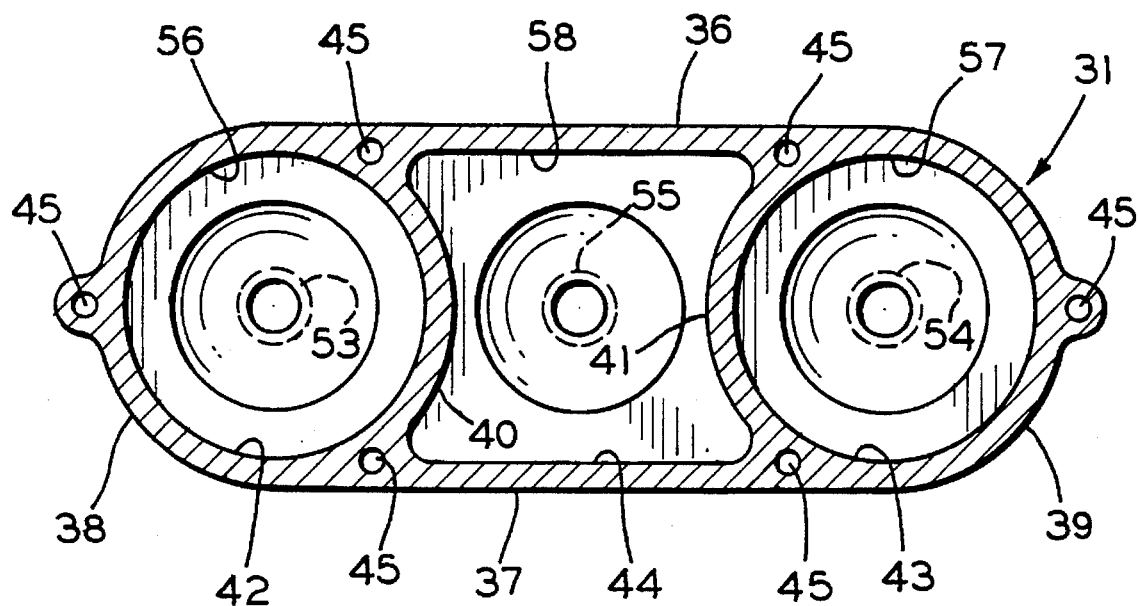
FIG. 4 is a cross sectional view through the molecular sieve container as taken along line 4—4 of FIG. 3.
Figure 5:
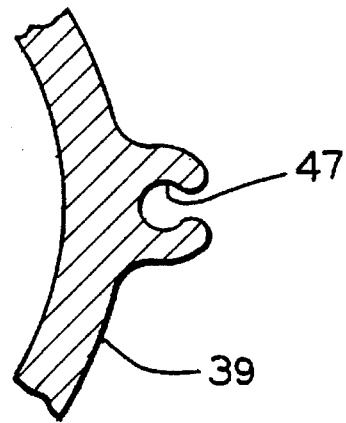
FIG. 5 is an enlarged fragmentary cross sectional view through an end of a modified extruded molecular sieve container.

Referring now to FIGS. 2–4 of the drawings, a molecular sieve unit 30 is shown according to a preferred embodiment of the invention. An extrusion 31 forms a main body portion of the unit 30. The extrusion 31 has an upper end 32 which is closed by an upper or first end cap 33 and has a lower end 34 which is closed by a lower or second end cap 35. The illustrated extrusion 31 is a right cylinder which has an exterior shape in section of flat sides 36 and 37 and rounded ends 38 and 39, as shown in FIG. 4. The extrusion 31 is hollow and is divided by webs 40 and 41 into three cavities 42–44 which extend the length of the extrusion. A plurality of small diameter passages 45 are formed in the extrusion 31 for receiving screws 46 to secure the end caps 33 and 35. The passages 45 may be closed, as shown in FIG. 4, or they may be open grooves 47, as shown in FIG. 5. In attaching the end caps 33 and 35, resilient seals 48 are positioned between the end cap 33 and the extrusion end 32 and between the end cap 35 and the extrusion end 34. Preferably, the end caps 33 and 35 have lips 49 which extend around the perimeter of the seals 48 and over the ends 32 and 34, respectively, of the extrusion 31. The lips 49 position the seals 48 and also prevent the seals 48 from extruding outwardly. Three threaded nipples 50–52 are formed in the upper end cap 33 for communicating, respectively, with the cavities 42–44. Similarly, three threaded nipples 53–55 are formed in the lower end cap 35 for communicating, respectively, with the cavities 42–44.

The closed cavity 42 forms a container 56 for a first molecular sieve bed and the nipples 50 and 53 define inlet and outlet ports, respectively, on opposite ends of the container 56. The closed cavity 43 forms a container 57 for a second molecular sieve bed and the nipples 51 and 54 define inlet and outlet ports, respectively, on opposite ends of the container 57. The closed cavity 44 forms a container 58 which functions as an accumulator for storing concentrated oxygen received from the molecular sieve bed containers 56 and 57. One of the nipples 52 and 55 serves as an inlet port and the other nipple 55 or 52 serves as an outlet port for the accumulator container 58. If desired, it will be appreciated that the nipples 52 and 55 for the accumulator container 58 both may be formed either on the upper end cap 33 or on the lower end cap 35. Or, a single nipple on either of the end caps 33 or 35 may serve both as an inlet port and as an outlet port for the pressurized oxygen stored in the accumulator container 58. For the molecular sieve containers 56 and 57, the feed gas normally flows downwardly through a filter material during gas separation. Consequently, the inlet ports normally will be on the upper cover 32 and the outlet ports will normally be on the lower cover. However, additional passages (not shown) may be easily formed to extend the length of the extrusion 31 and that such passages may be used to locate all of the ports on one of the end caps 33 or 35.

It should be appreciated that the extrusion 31 can be extruded to an indefinite length, with the length being limited only by the capacity to handle a long extrusion. In manufacturing the molecular sieve unit 30, the extrusion 31 is cut into the length needed to give a desired volumetric capacity to the containers 56–58. The same extrusion 31 may be used in manufacturing molecular sieve units 30 for different capacity oxygen concentrators merely by changing the length of the extrusion 31.

During use, the molecular sieve containers 56 and 57 are partially filled with a commercially available molecular sieve material that will pass a flow of oxygen while blocking a flow of nitrogen. After extensive use, it may be necessary to replace the molecular sieve material. The molecular sieve unit 30 is easily serviced by merely removing the upper end cap 33 and replacing the molecular sieve material in the cavities 42 and 43. In some prior art molecular sieve beds, assembly screw holes could become worn or damaged sufficiently that the sieve beds could not be serviced. This problem is eliminated by forming the screw passages 45 the length of the extrusion 31. The ends of the passages 45 may be threaded for receiving machine screws or self tapping screws 46 may be used to secure the end caps 33 and 35. If the threads or the ends of the passages 45 become worn, the extrusion 31 can continue to be used and serviced merely by using longer screws.

Figure 6:
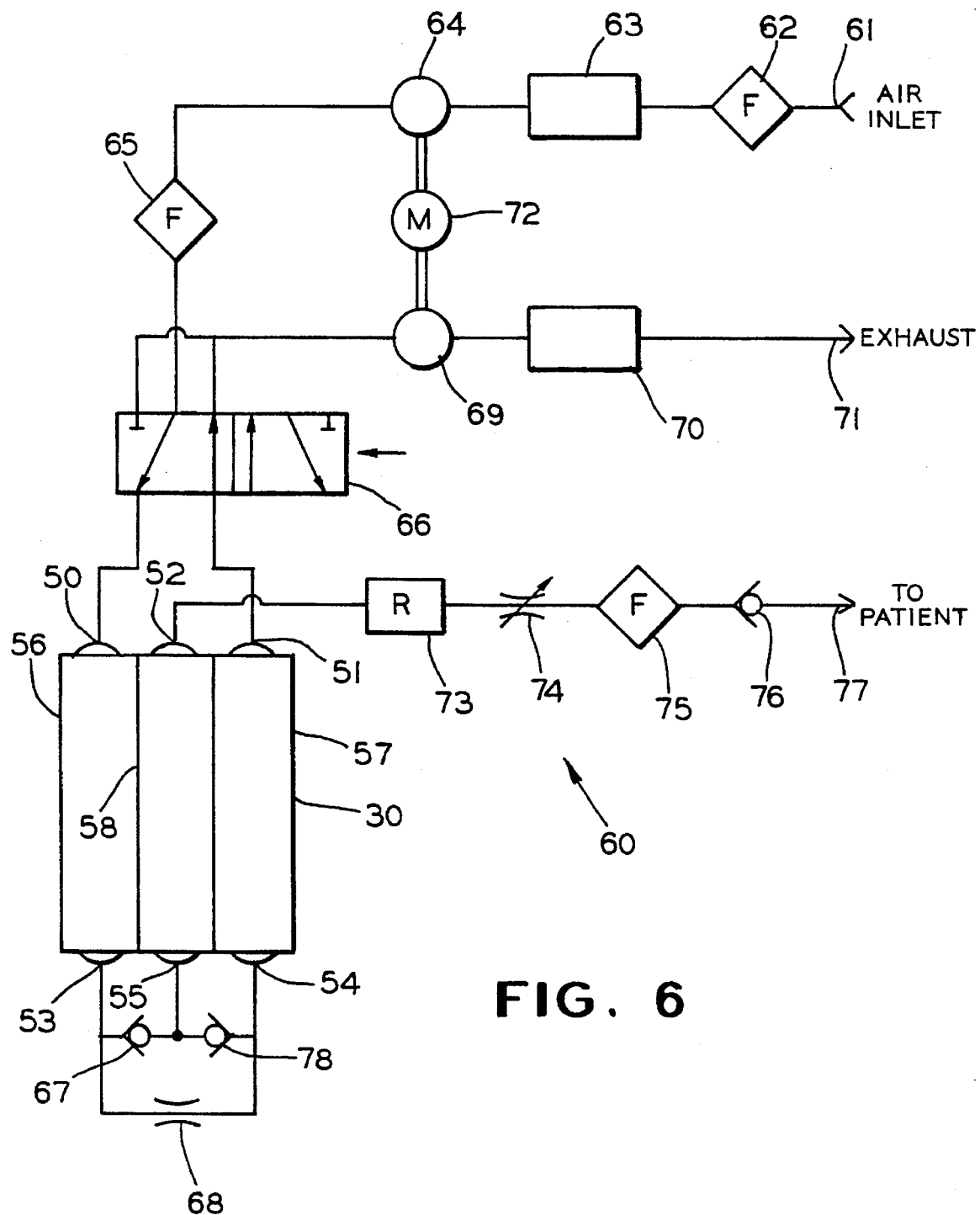
FIG. 6 is a schematic diagram of a pressure swing oxygen concentrator with the molecular sieve container of FIG. 2.

FIG. 6 is a pneumatic diagram of an oxygen concentrator 60 incorporating the molecular sieve unit 30. An ambient air inlet 61 is connected through a first filter 62 and through an optional muffler 63 to the inlet to a compressor 64. The compressor 64 applies pressurized air through a second filter 65 to a two position valve 66. In the illustrated position, the valve 66 applies the filtered pressurized air to the inlet port 50 of the molecular sieve container 56. The concentrated oxygen flows from the outlet port 53 of the molecular sieve container 56 through a check valve 67 to the inlet port 55 to the accumulator 58.

While oxygen is being concentrated in the molecular sieve container 56, nitrogen is purged from the molecular sieve container 57. The outlet port 53 also is connected through a small orifice 68 to deliver a low flow of oxygen to the outlet port 54 of the molecular sieve container 57 for purging nitrogen from the container 57. The inlet port 51 of the molecular sieve container 57 is connected through the valve 66 to an optional suction pump 69 and then through an exhaust muffler 70 of an exhaust gas outlet 71. A single motor 72 may operate both the compressor 64 and the optional suction pump 69. The suction pump 69 functions to reduce the pressure in the molecular sieve container 57 during the purge cycle to increase the purge efficiency.

The concentrated oxygen at the outlet port 52 from the accumulator 58 flows through a pressure regulator 73, through a flow meter 74, through a final filter 75 and finally through a check valve 76 to a concentrated oxygen outlet 77. The outlet 77 may be connected, for example, through a suitable hose to a cannula for supplying supplemental oxygen to a patient's respiratory system.

As the molecular sieve container 56 becomes saturated with nitrogen, the oxygen flow at the outlet port 53 will decrease. Periodically, the position of the valve 66 is changed to alternate the operation of the molecular sieve containers 56 and 57 between gas separation and nitrogen purge cycles. When the position of the valve 66 is changed from the illustrated position, the filtered pressurized feed air will be applied to the inlet port 51 to the molecular sieve container 57. The outlet port 54 from the container 57 is connected through a check valve 78 to the accumulator inlet port 55 and through the orifice 68 to the outlet port of the molecular sieve container 56. The valve 66 also connects the inlet port 50 to the molecular sieve container 56 to the suction port of the pump 69 for drawing nitrogen and any other retained gases from the molecular sieve container 56.

Figure 7:
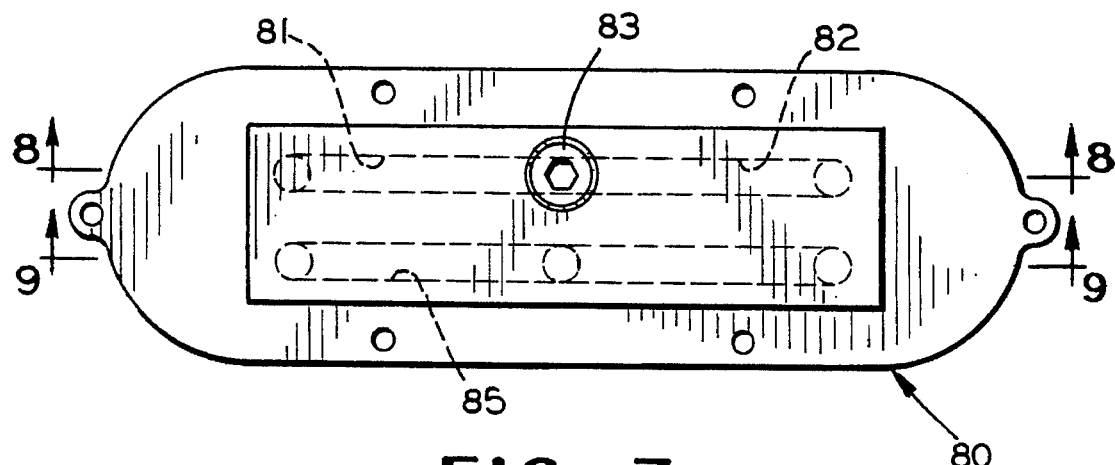
FIG. 7 is a bottom plan view of a lower end cap for an extruded molecular sieve container according to a modified embodiment of the invention.
Figure 8:
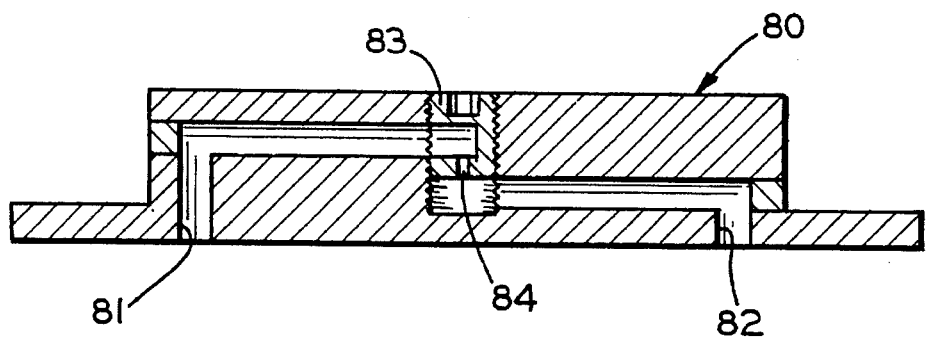
FIG. 8 is a cross sectional view as taken along line 8—8 of FIG. 7.
Figure 9:
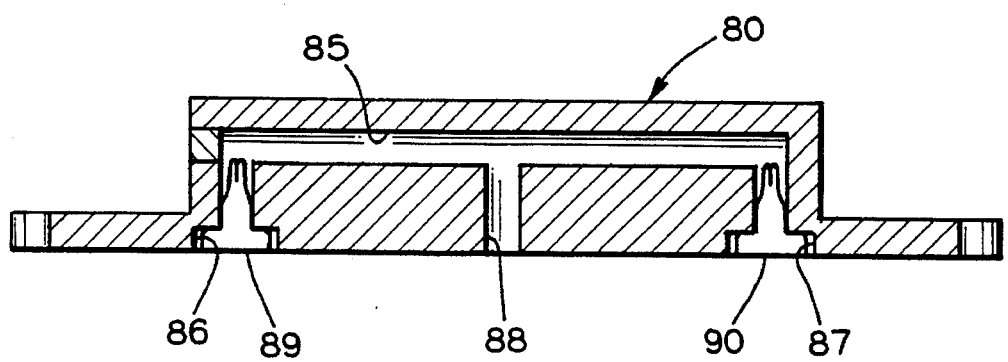
FIG. 9 is a cross sectional view as taken along line 9—9 of FIG. 7.

FIGS. 7–9 show a modified lower end cap 80 suitable for use with the extrusion 31 for forming a molecular sieve container. Connections between two molecular sieves and an accumulator are formed as an integral part of the lower end cap 80. Two passages 81 and 82 form ports to the two molecular sieves which are separated by a plug 83 having a calibrated orifice 84 which interconnects the passages 81 and 82. A third passage 85 has ends 86 and 87 which are located to communicate with the two molecular sieves and an extension 88 which is located to communicate with the accumulator. Resilient duck bill check valves 89 and 90 are positioned, respectively, in the passage ends 86 and 87. The orifice 84 functions identical to the orifice 68 in FIG. 6 and the check valves 89 and 90 function as the check valves 67 and 78 in FIG. 6. It will be seen that the lower end cap 80 is a simplified unitary construction which incorporates the passages, valves and orifice in the portion of the circuit illustrated by the lower connections to the molecular sieve unit 30 in FIG. 6.

Figure 10:
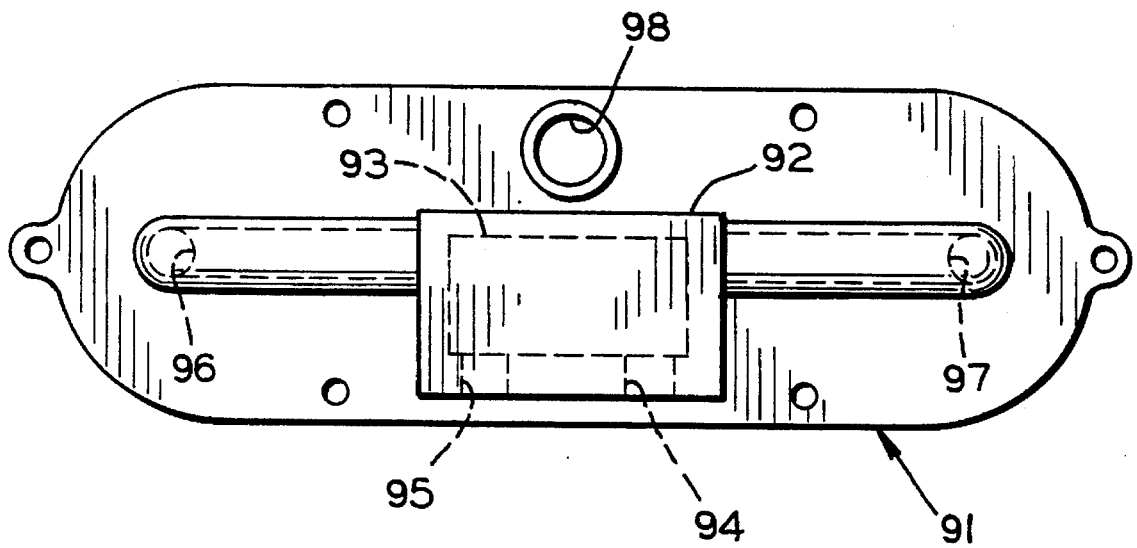
FIG. 10 is a top plan view of an upper end cap for an extruded molecular sieve contains according to a modified embodiment of the invention.
Figure 11:
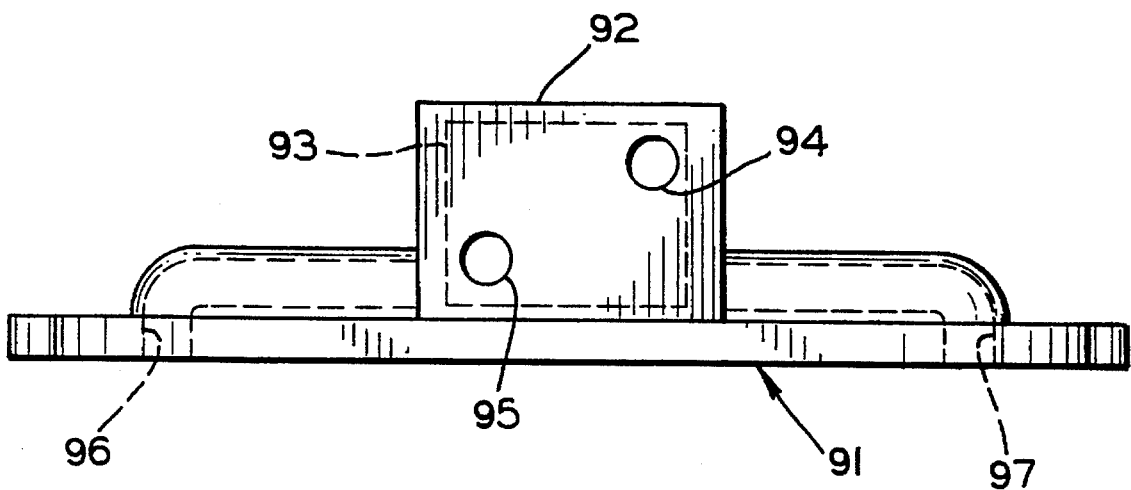
FIG. 11 is a side elevational view of the upper end cap of FIG. 10.

FIGS. 10 and 11 show a modified upper end cap 91 suitable for use with the extrusion 31 for forming a molecular sieve container. The upper end cap 91 includes an integral housing 92 for mounting a two position valve 93 which may be similar to the valve 66 in the pneumatic circuit of FIG. 6. A pressurized air inlet port 94 and an exhaust gas outlet port 95 are formed in the housing 92. An inlet port 96 is located to communicate with one of the molecular sieves in the extrusion 31, an inlet port 97 is located to communicate with the other molecular sieve and a concentrated oxygen outlet port 98 is located to communicate with the accumulator in the extrusion 31. It will be appreciated that use of the illustrated lower end cap 80 and upper end cap 91 with the extrusion 31 simplify the construction of a molecular sieve container for an oxygen concentrator and can greatly reduce the risk of assembly error for the pneumatic connections to the molecular sieves in an oxygen concentrator.

It will be appreciated that various modifications and changes may be made to the above described preferred embodiment of a molecular sieve container for an oxygen concentrator without departing from the spirit and the scope of the following claims. Although the preferred container includes two molecular sieve beds and a concentrated oxygen accumulator, it will be appreciated that the accumulator may be eliminated and that two or more molecular sieve beds may be formed as a unit. It will further be appreciated that when the extrusion forms three or more molecular sieve beds, the molecular sieve beds can be cycled between gas separation and gas purge cycles with known flow controllers.

I claim:

1. A molecular sieve container for an oxygen concentrator comprising an elongated extrusion having first and second open ends and at least two cavities extending between said ends, said cavities each having an open first end at said first extrusion end and an open second end at said second extrusion end, a first end cap secured to said first extrusion end to close said first ends of said cavities, a second end cap secured to said second extrusion end to close said second ends of said cavities, wherein at least two of said cavities define first and second containers for separate molecular sieves, and means in said end caps forming inlet and outlet ports for each molecular sieve container.

2. A molecular sieve container, as set forth in claim 1, and wherein said means in said end caps forming inlet and outlet ports for each molecular sieve container includes means in said first end cap forming a separate inlet port for each molecular sieve container, and means in said second end cap forming a separate outlet port for each molecular sieve container.

3. A molecular sieve container, as set forth in claim 2, and wherein each end cap has a separate threaded opening connecting to each molecular sieve, said threaded opening in said first end cap connecting with each molecular sieve container defining the inlet port to such container and said threaded opening in said second end cap connecting with each molecular sieve container defines the outlet port from such container.

4. A molecular sieve container, as set forth in claim 3, and wherein at least three cavities extend between said extrusion ends, wherein one of said cavities defines an accumulator container for receiving and storing concentrated oxygen from said molecular sieve containers, wherein said first end cap has a threaded opening connecting with said accumulator container defining an outlet port, and wherein said second end cap has a threaded opening connecting with said accumulator container defining an inlet port.

5. A molecular sieve container, as set forth in claim 1, and wherein at least three cavities extend between said extrusion ends, and wherein one of said cavities defines an accumulator container for receiving and storing concentrated oxygen from said molecular sieve containers.

6. A molecular sieve container, as set forth in claim 5, and wherein said second end cap includes means forming an inlet port to said accumulator container, and wherein said first end cap includes means forming an outlet port from said accumulator container.

7. A molecular sieve container, as set forth in claim 6, and wherein said second end cap includes means connecting said outlet ports from each of said first and second molecular sieve containers to said inlet port to said accumulator container.

8. A molecular sieve container, as set forth in claim 7, and wherein said connecting means from each of said molecular sieve containers includes check valve means for preventing a flow of gas from said accumulator container back to such molecular sieve container.

9. A molecular sieve container, as set forth in claim 8, and wherein said second end cap further includes a restricted passage means connecting together said outlet ports from said first and second molecular sieve containers for permitting a limited flow of gas from a higher pressure one of said molecular sieve containers to a lower pressure one of said molecular sieve containers.

10. A molecular sieve container, as set forth in claim 9, and wherein said first end cap includes said inlet ports to each molecular sieve container, a feed gas port and an exhaust gas port, valve means mounted to said first end cap, passage means connecting said first and second molecular sieve bed inlet ports, said feed gas port and said exhaust gas port to said valve means, wherein said valve means has a first position in which said feed gas port is connected to said first molecular sieve container inlet port and said exhaust gas port is connected to said second molecular sieve container inlet port, and wherein said valve means has a second position in which said feed gas port is connected to said second molecular sieve container inlet port and said exhaust gas port is connected to said first molecular sieve container inlet port.

11. A molecular sieve container, as set forth in claim 10, and wherein said extrusion has a plurality of passages extending between said first and second extrusion ends, and further including a first plurality of screws engaging said passages to secure said first end cap to said extrusion and a second plurality of screws engaging said passages to secure said second end cap to said extrusion.

12. A molecular sieve container, as set forth in claim 11, and wherein at least some of said plurality of passages have an open side.

13. A molecular sieve container, as set forth in claim 1, and wherein said extrusion has a plurality of passages extending between said first and second extrusion ends, and further including a first plurality of screws engaging said passages to secure said first end cap to said extrusion and a second plurality of screws engaging said passages to secure said second end cap to said extrusion.

14. A molecular sieve container, as set forth in claim 13, and wherein at least some of said plurality of passages have an open side.

15. A molecular sieve container for an oxygen concentrator comprising an elongated extrusion having first and second open ends and at least two cavities extending between said ends, said cavities each having an open first end at said first extrusion end and an open second end at said second extrusion end, a first end cap closing said first ends of said cavities, a second end cap closing said second ends of said cavities, wherein at least two of said cavities define first and second containers for separate molecular sieves, means forming a separate inlet port for each molecular sieve container, and means forming a separate outlet port for each molecular sieve container.

16. A molecular sieve container, as set forth in claim 15, and wherein said extrusion includes a cavity closed by said first and second end caps defining a concentrated gas accumulator, and means forming at least one port into said accumulator.

17. A molecular sieve container, as set forth in claim 16, and wherein said ports are formed in at least one of said first and second end caps.

* * * * *